United States Patent [19]
Wilkinson et al.

[11] Patent Number: 5,366,818
[45] Date of Patent: Nov. 22, 1994

[54] SOLID POLYMER FUEL CELL SYSTEMS INCORPORATING WATER REMOVAL AT THE ANODE

[75] Inventors: David P. Wilkinson, Vancouver; Henry H. Voss, West Vancouver; David S. Watkins, Coquitlam; Keith B. Prater, Vancouver, all of Canada

[73] Assignee: Ballard Power Systems Inc., North Vancouver, Canada

[21] Appl. No.: 970,614

[22] Filed: Nov. 3, 1992

Related U.S. Application Data

[63] Continuation-in-part of Ser. No. 641,601, Jan. 15, 1991, Pat. No. 5,260,143.

[51] Int. Cl.$^5$ .................. H01M 8/00; H01M 8/04; H01M 8/10
[52] U.S. Cl. ........................... 429/13; 429/17; 429/26; 429/30; 429/33
[58] Field of Search ............... 429/13, 17, 26, 30, 429/33

[56] References Cited

U.S. PATENT DOCUMENTS

| | | |
|---|---|---|
| 3,012,086 | 12/1961 | Vahldieck . |
| 3,172,784 | 3/1965 | Blackmer . |
| 4,037,024 | 7/1977 | Landau ................. 429/17 |
| 4,631,239 | 12/1986 | Spurrier et al. . |
| 4,684,582 | 8/1987 | Granata, Jr. et al. . |
| 4,729,932 | 3/1988 | McElroy . |
| 4,795,683 | 1/1989 | McElroy . |
| 4,826,741 | 5/1989 | Adlhart et al. . |
| 4,826,742 | 5/1989 | Reiser . |
| 4,973,530 | 11/1990 | Vanderborgh et al. ........... 429/13 |
| 5,047,298 | 9/1991 | Perry et al. . |

FOREIGN PATENT DOCUMENTS

| | | |
|---|---|---|
| 1547910 | 11/1968 | France . |
| 1814702 | 1/1969 | Germany . |
| 894454 | 4/1962 | United Kingdom . |
| 2139110 | 11/1984 | United Kingdom . |
| WO92/13365 | 8/1992 | WIPO . |

OTHER PUBLICATIONS

"Water Recovery From Fuel Cells And Lunar Minerals", *Industrial And Engineering Chemistry*, vol. 56, No. 2, pp. 29–31, Hendel, Mar. 1964.

"Solid Polymer Electrolyte (SPE) Fuel Cell Power System For The Propulsion Of An Underwater Vehicle", *General Electric Report*, P.O. No. 9-521-52227 (excerpts), General Electric Company, Mar. 1978, (pages unavailable).

"Proton Exchange Membrane Fuel Cell Development", *Proceedings Of The 24th Intersociety Energy Conversion Engineering Conference*, vol. 3, pp. 1587–1591, Lawrance et al., Aug. 1989.

"Canadian Solid Polymer Fuel Cell Development", *Proceedings of the Fourth Annual Battery Conference On Applications And Advances*, Watkins et al., Jan. 1989. (pages unavailable).

"Advanced Space Power PEM Fuel Cell Systems", *Proceedings Of The European Space Power Conference*, vol. 1, pp. 211–216, Vanderborgh et al., Aug. 1989.

"A Design Study Of High Power Density Solid Poly- (List continued on next page.)

*Primary Examiner*—Helane Myers
*Assistant Examiner*—Nhat D. Phan
*Attorney, Agent, or Firm*—McAndrews, Held & Malloy, Ltd.

[57] ABSTRACT

A solid polymer fuel cell electric power generation system removes a substantial portion of water accumulated at the cathode in the outlet fuel stream of the anode. The system permits the operation of a hydrogen-/oxygen fuel cell in a dead-ended mode where substantially pure oxygen is employed as the oxidant supply or using low oxygen stoichiometry where a dilute oxidant source, such as oxygen-containing air, is employed as the oxidant supply. The system thereby eliminates the need for an oxygen recirculation pump in systems operating on substantially pure oxygen, and substantially reduces the parasitic load to pressurize the oxidant stream in systems operating on dilute oxidant streams.

54 Claims, 7 Drawing Sheets

OTHER PUBLICATIONS mer Fuel Cells", *Proceedings Of The Electrochemical Society Symposium On Fuel Cells,* vol. 89, No. 14, pp. 71–86, Nov. 1989.

*The Ballard Fuel Cell–An Overview* (excerpts). Ballard Power Sysrems Inc., at least as early as May 1990. (pages unavailable).

"Water Transport Across The Membrane In Solid Polymer Electrolyte Fuel Cell", *Extended Abstracts of the Battery Division of the Electrochemical Society,* Full Meeting, Seattle, Washington (Oct. 14–16, 1990), Koch et al., Oct. 1990. (pages unavailable).

"Water-Balance Calculations For Solid-Polymer-Electrolyte Fuel Cells", *J. Electrochem. Soc.,* (vol. 137, No. 11) (Nov. 1990), Bernardi, Nov. 1990. (pages unavailable).

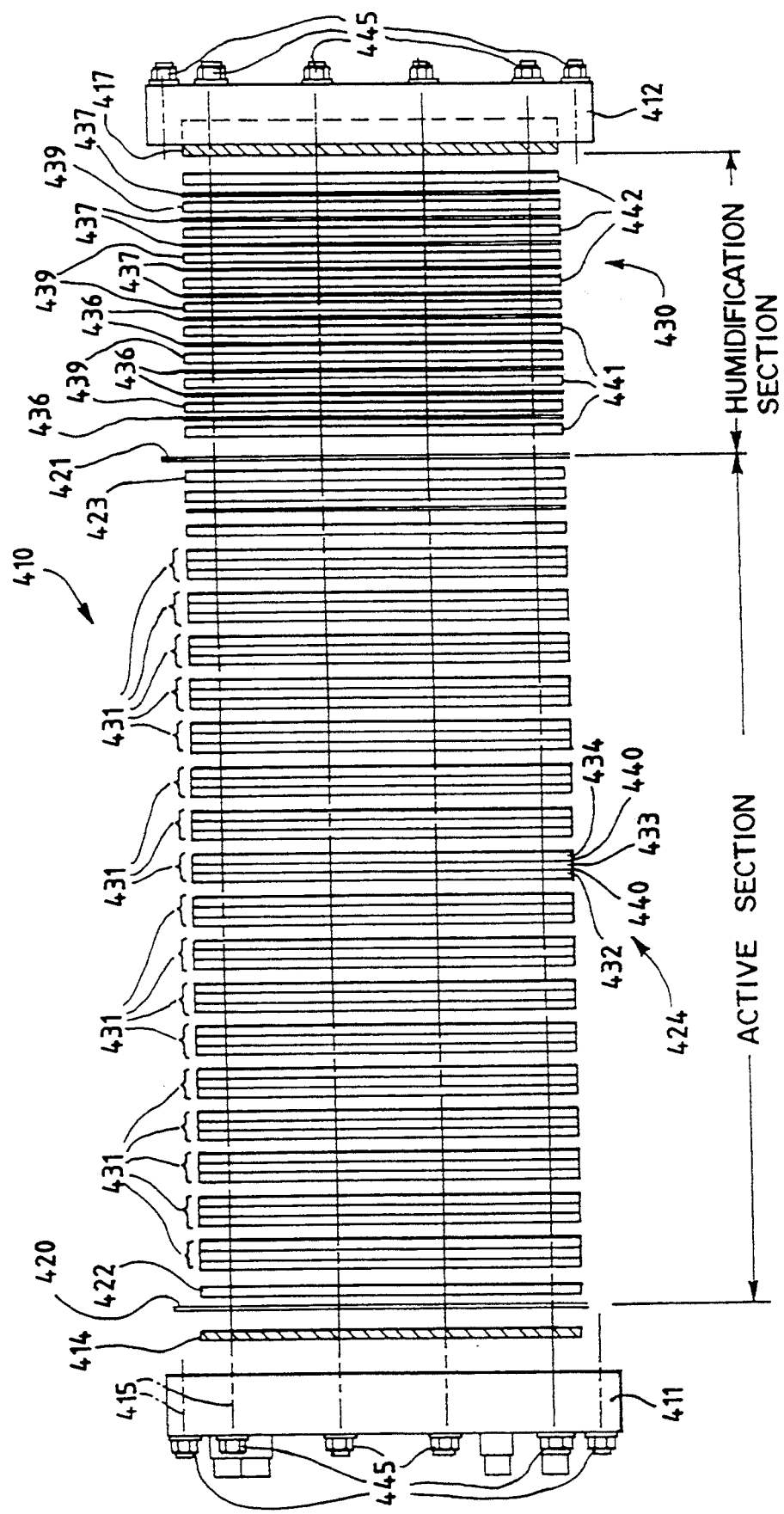

SOLID POLYMER FUEL CELL SYSTEMS INCORPORATING WATER REMOVAL AT THE ANODE

CROSS-REFERENCE TO RELATED APPLICATION

This application is a continuation-in-part of U.S. patent application Ser. No. 07/641,601 filed Jan. 15, 1991, now U.S. Pat. No. 5,260,143 issued Nov. 9, 1993, entitled "Method and Apparatus For Removing Water From Electrochemical Fuel Cells." The related application describes techniques for the removal of water accumulated at the cathode in individual fuel cell structures.

FIELD OF THE INVENTION

The present invention relates to electrochemical fuel cells. More particularly, the present invention relates to solid polymer fuel cell systems, employing substantially pure and/or impure fuel and oxidant streams, in which a substantial portion of the water accumulated at the cathode is removed in the outlet fuel stream of the anode.

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Such fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes to an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to form liquid water as the reaction product.

Perfluorosulfonic ion exchange membranes, such as those sold by DuPont under its Nafion trade designation, must be hydrated or saturated with water molecules for ion transport to occur. It is generally accepted that, as cations are transported through such perfluorosulfonic membranes, water molecules associated with those cations are also transported. This phenomenon is sometimes referred to as "water pumping" and results in a net flow of water from the anode side of the membrane to the cathode side. Thus, membranes exhibiting the water pumping phenomenon can dry out on the anode side if water transported along with hydrogen ions (protons) is not replenished. Such replenishment is typically provided by humidifying the hydrogen-containing fuel stream prior to introducing the fuel stream into the cell. Similarly, the oxygen-containing oxidant stream is typically humidified prior to introducing the oxidant stream into the fuel cell to prevent the membrane from drying out on the cathode side. Therefore, fuel cells employing these cation exchange membranes require accumulated water to be removed from the cathode (oxidant) side, both as a result of the water transported across the membrane from the water pumping phenomenon and product water formed at the cathode from the reaction of hydrogen ions with oxygen.

The accumulation of water at the cathode is problematic for several reasons. First, the presence of liquid water in the vicinity of the catalyst layer reduces the accessibility of the catalyst to the reactants, resulting in a reduction in the power of the fuel cell. This phenomenon is sometimes referred to as "flooding" of the catalyst sites. Second, the accumulation of liquid water at the cathode interferes with the permeation of reactants through the cathode to the catalyst, again resulting in a loss of power to the fuel cell. Third, the excessive accumulation of liquid water at the cathode can impart physical changes to the adjacent membrane, causing localized swelling and expansion of the membrane. Conversely, dehydration can cause drying and shrinkage of the membrane, resulting in corresponding mechanical stresses at the electrocatalytic interface.

Conventional water removal techniques generally involve conducting water accumulated at the cathode away from the cathode catalyst layer and toward the oxidant stream exiting the cathode. One conventional water removal technique is wicking, or directing the accumulated water away from the cathode using capillaries incorporated in the cathode. Another conventional water removal technique employs screens or meshes within the cathode to conduct water away from the catalyst layer. Still another conventional water removal technique is to incorporate hydrophobic substances, such as polytetrafluoroethylene ("PTFE"; trade name Teflon), into the cathode sheet material to urge accumulated water away from the cathode. These conventional water removal methods are disadvantageous because:

(1) they require water to be expelled from the membrane/electrocatalytic layer into the cathode's porous structure;

(2) the presence of liquid water restricts the flow of oxidant through the interstices of the porous gas diffusion electrode; and (3) the presence of liquid water in the oxidant flow channels may restrict the flow of oxidant gas in the channels.

In systems incorporating water removal at the anode, the water may be drawn through the membrane away from the cathode side and into the anode outlet stream while the water is being formed at the membrane/electrocatalytic interface, leaving the oxidant gas free to diffuse to the active catalyst sites.

In U.S. patent application Ser. No. 07/641,601 filed Jan. 15, 1991, now U.S. Pat. No. 5,260,143 issued Nov.

9, 1993, it was disclosed that a new type of experimental perfluorosulfonic ion exchange membrane, sold by Dow under the trade designation XUS 13204.10, did not appear to significantly exhibit the water pumping phenomenon in connection with the transport of hydrogen ions across the membrane. Thus, the transport of water molecules across the Dow experimental membranes did not appear to be as extensive in the transport of hydrogen ions as in the Nafion-type membranes. This reduction of water pumping in the Dow experimental membranes decreases the accumulation of transported water at the cathode and simplifies the removal of all water, which would normally appear at the cathode, on the anode side. As indicated in the earlier patent application, water removal on the anode side can also be practiced with Nafion-type membranes.

As discussed above, hydrogen ion conductivity through ion exchange membranes generally requires the presence of water molecules. The fuel and oxidant gases are therefore humidified prior to introducing them to the cell to maintain the water saturation of the membranes within the MEAs. Ordinarily, the fuel and oxidant gases are humidified by flowing each gas on one side of a water exchange membrane and by flowing deionized water on the opposite side of the membrane. Deionized water is preferred to prevent membrane contamination by undesired ions. In such membrane based humidification arrangements, water is transferred across the membrane to the fuel and oxidant gases. Nafion is a suitable and convenient humidification membrane material in such applications, but other commercially available water exchange membranes are suitable as well. Other non-membrane based humidification techniques could also be employed, such as exposing the gases directly to water in an evaporation chamber to permit the gas to absorb evaporated water.

It is generally preferred to humidify the fuel and oxidant gases at, or as close as possible to, the operating temperature and pressure of the fuel cell. The ability of gases such as air to absorb water varies significantly with changes in temperature and pressure. Humidification of the air (oxidant) stream at a temperature significantly below fuel cell operating temperature could ultimately dehydrate the membrane. Consequently, it is preferable to integrate the humidification function with the active portion of the fuel cell stack, and to condition the fuel and oxidant streams to nearly the same temperature and pressure as the active section of the stack. In such an integrated arrangement, the coolant water stream from the active section, which is at or near the cell operating temperature, is used as the humidification water stream. Similarly, the fuel and oxidant streams are typically directed via manifolds or headers through the active section to condition each to cell temperature prior to introducing them to the humidification section.

In addition to integrating the coolant water stream of the active section with the humidification water stream of the humidification section, it is also advantageous to integrate the fuel cell product water stream with the coolant stream, and thereby use the product water generated electrochemically in the fuel cell stack to regulate the temperature of the stack. In this regard, the use of product water as the coolant avoids the need to provide a separate external source of coolant fluid, since the water generated by the cell is itself a suitable coolant fluid. The use of product water as the coolant fluid is also advantageous during start-up, when the relatively warm product water stream can be used to bring the active section up to operating temperature.

The use of fuel cell designs and operating conditions that permit the removal of accumulated water in the outlet fuel stream of the anode offers several advantages. In particular, water removal on the anode side permits the operation of a hydrogen/oxygen fuel cell in a "dead-ended" mode on the cathode or oxygen side. That is, the oxygen-containing oxidant stream can be fed to the cathode and consumed substantially completely, producing essentially no outlet stream from the cathode. Dead-ended operation thus eliminates the need for an oxygen recirculation pump. Oxygen recirculation pumps are expensive and difficult to maintain because of the corrosive effects of moist oxygen-containing streams like the humidified oxidant stream circulated through hydrogen/oxygen fuel cells. The elimination of an oxygen recirculation pump from a fuel cell system reduces the overall cost of the system and improves the reliability of the fuel cell because of the reduced possibility for oxygen leakage and fires. Eliminating the oxygen recirculation pump also reduces the parasitic (hotel) load on the fuel cell system, resulting in a higher proportion of the electrical power from the fuel cell system being available for delivery to the external load instead of being consumed by operation of the oxygen recirculation pump.

Removal of accumulated water from the anode side of the fuel cell also offers systems advantages when air is used as the oxidant. As described in more detail below, the removal of water at the anode permits the effective operation of fuel cells at lower air flow rates. The term "stoichiometry" is used to characterize gas flow rates. As used herein, stoichiometry refers to the ratio of the quantity of reactant supplied to the fuel cell to the quantity of reactant consumed by the fuel cell. An $H_2$ stoichiometry of 1.0 means that the quantity of hydrogen consumed by the fuel cell equals the quantity of hydrogen supplied to the fuel cell. In a fuel cell operated with dead-ended oxygen, the stoichiometry of oxygen would be 1.0, the amount of oxygen supplied to the fuel cell being substantially completely consumed. Likewise, an $H_2$ stoichiometry of 2.0 means that the quantity of hydrogen supplied to the fuel cell is twice the quantity of hydrogen consumed by the fuel cell.

Low oxidant stream stoichiometry, which is made possible by the removal of water at the anode, reduces the parasitic load required to pressurize the oxidant stream. The power required to pressurize the oxidant stream represents a substantial and significant parasitic load in systems operating with dilute oxidant streams, such as oxygen-containing air. The parasitic load is directly proportional to oxidant stoichiometry, so that a decrease in the oxidant stoichiometry reduces the parasitic load, thereby improving the net power deliverable from the system to an external electrical load.

Recently, efforts have been devoted to identifying ways to operate electrochemical fuel cells using impure hydrogen as the fuel. Fuel cell systems operating on substantially pure hydrogen are generally disadvantageous because of the expense of producing and storing pure hydrogen gas. In addition, the use of liquid fuels is preferable to pure, bottled hydrogen in mobile and vehicular applications of electrochemical fuel cells.

Water removal at the anode also offers systems advantages when impure hydrogen is employed as the fuel source. By proper design of the fuel cell and operating conditions, accumulated water can be removed into the exhaust fuel stream, thereby permitting the operation of such a fuel cell system on dead-ended oxygen or low stoichiometry air with the systems advantages described above.

Accordingly, it is an object of the present invention to provide solid polymer fuel cell systems in which water accumulated at the cathode is removed in the outlet fuel stream of the anode, thereby avoiding recirculation of the oxidant stream.

It is also an object of the invention to provide solid polymer fuel cell systems incorporating water removal on the anode side that can be operated using substantially pure fuel streams, such as bottled hydrogen, as well as impure fuel streams, such as those produced from the conversion of hydrocarbons to hydrogen.

It is a further object of the invention to provide solid polymer fuel cell systems incorporating water removal on the anode side that can be operated using substantially pure oxidant streams, such as bottled oxygen, as well as impure oxidant streams, such as oxygen-containing air.

SUMMARY OF THE INVENTION

The above and other objects are achieved by a solid polymer fuel cell electric power generation system in which water accumulated at the cathode is removed in the outlet fuel stream of the anode. The system comprises:
(A) a hydrogen-containing inlet fuel stream;
(B) an oxygen-containing inlet oxidant stream;
(C) a fuel cell stack comprising at least one fuel cell comprising:
  (1) an anode having an inlet for directing the inlet fuel stream to the catalytically active portion of the anode to produce cations from the fuel stream and an outlet fuel stream;
  (2) a cathode having an inlet for directing the inlet oxidant stream to the catalytically active portion of the cathode to produce anions from the oxidant stream, the anions reacting with the cations to form water at the cathode;
  (3) an ion exchange membrane interposed between the anode and the cathode, the membrane facilitating the migration of cations from the anode to the cathode and isolating the inlet fuel stream from the inlet oxidant stream; and
  (4) an electrical path for conducting electric current between the anode to the cathode; and
(D) a water separator for removing water from the outlet fuel stream to produce a dehumidified fuel stream and a removed water stream.

A substantial portion of water accumulated at the cathode is absorbed in the outlet fuel stream.

As used herein, "dehumidified" means that the relative humidity (moles of water per moles of gas relative to the same ratio when the gas is saturated with water at a given temperature and pressure) of the fluid stream has been reduced. It does not mean or imply a complete removal of water from the stream. In other words, a dehumidified stream can still have water present in the stream, but the relative amount of water present is less than that contained in the stream prior to dehumidification.

In the preferred system, the stoichiometry of the inlet oxidant stream is less than about 2.0.

In systems where the inlet fuel stream comprises substantially pure hydrogen gas, the dehumidified fuel stream is preferably recirculated to the inlet fuel stream. It may be desirable, from time to time, to purge some of the recirculated hydrogen, thereby evacuating accumulated impurities from the anode such as, for example, nitrogen that has diffused across the membrane from the cathode.

In systems where the inlet fuel stream comprises hydrogen gas and byproducts from a hydrocarbon conversion process, the dehumidified fuel stream is preferably vented from the system, thereby evacuating accumulated impurities, such as carbon dioxide, from the anode. In systems where the inlet oxidant stream is substantially pure oxygen gas, the stoichiometry of the inlet oxidant stream is preferably approximately 1.0, so that the oxygen gas is substantially entirely consumed at the cathode. In such a preferred system, the cathode preferably further comprises a normally closed purge valve which is opened periodically to vent the inlet oxidant stream from the system, thereby evacuating accumulated impurities from the cathode. In systems where the inlet oxidant stream comprises oxygen-containing air and the cathode further produces an outlet oxidant stream, the outlet oxidant stream is preferably vented from the system.

In systems incorporating water removal at the anode, some of the water accumulated at the cathode can also be removed with the cathode outlet stream at the same time that some of the water accumulated at the cathode is removed with the anode outlet stream. In such instances, the preferred system further comprises a water separator for removing water from the outlet oxidant stream to produce a dehumidified oxidant stream and a removed water stream.

In another embodiment, water accumulated at the cathode is removed in the anode outlet stream, and the water so removed is employed as both the coolant and the reactant humidification water source. Such a system comprises:
(A) a hydrogen-containing inlet fuel stream;
(B) an oxygen-containing inlet oxidant stream;
(C) an inlet coolant water stream;
(D) a humidification assembly comprising:
  (1) at least one fuel humidification section comprising a fuel humidification water supply and means for imparting water from the fuel humidification water supply to the inlet fuel stream to produce a humidified fuel stream;
  (2) at least one oxidant humidification section comprising an oxidant humidification water supply and means for imparting water from the oxidant humidification water supply to the inlet oxidant stream to produce a humidified oxidant stream;
(E) a fuel cell stack comprising:
  (1) an electrochemically active section comprising at least one fuel cell, the fuel cell comprising:
    (a) an anode having an inlet for directing the humidified fuel stream to the catalytically active portion of the anode to produce cations from the humidified fuel stream and an outlet fuel stream;
    (b) a cathode having an inlet for directing the humidified oxidant stream to the catalytically active portion of the cathode to produce anions from the humidified oxidant stream, the anions reacting with the cations to form water at the cathode;
    (c) an ion exchange membrane interposed between the anode and the cathode, the membrane facilitating the migration of cations from the anode to the cathode and isolating the humidified fuel stream from the humidified oxidant stream; and (d) an electrical path for conducting electric current between the anode to the cathode, (2) at least one coolant passage having an inlet for directing the inlet coolant water stream into thermal contact with the electrochemically active section to absorb heat generated within the active section and produce an outlet coolant water stream;

(F) a heat exchanger for removing heat from the outlet coolant water stream to produce a chilled coolant water stream;

(G) a water separator for removing water from the outlet fuel stream to produce a dehumidified fuel stream and a removed water stream; and (H) a reservoir for receiving the removed water stream from the water separator and the chilled coolant water stream from the heat exchanger.

The inlet coolant water stream is drawn from the reservoir.

In the preferred system, the outlet coolant water stream feeds at least one of the fuel humidification water supply and the oxidant humidification water supply. The coolant stream most preferably feeds both of the fuel humidification water supply and the oxidant humidification water supply.

In the preferred system, the water separator and the reservoir are integral, and the water contained within the reservoir promotes the condensation of water from the outlet fuel stream.

The preferred means for imparting water from the each reactant humidification water supply to the inlet reactant stream comprises a chamber for receiving the reactant humidification water supply, a chamber for receiving the inlet reactant stream, and a water transport membrane interposed between the chambers for transporting water from the reactant humidification water supply to the inlet reactant stream to produce a humidified reactant stream.

In a further embodiment, water accumulated at the cathode is removed in the anode outlet stream and the water so removed is employed as the humidification water source. Such a system comprises:

(A) a hydrogen-containing inlet fuel stream;
(B) an oxygen-containing inlet oxidant stream;
(C) a humidification assembly comprising:
  (1) at least one fuel humidification section comprising a fuel humidification water supply and means for imparting water from the fuel humidification water supply to the inlet fuel stream to produce a humidified fuel stream;
  (2) at least one oxidant humidification section comprising an oxidant humidification water supply and means for imparting water from the oxidant humidification water supply to the inlet oxidant stream to produce a humidified oxidant stream;
(D) a fuel cell stack comprising:
  (1) an electrochemically active section comprising at least one fuel cell, the fuel cell comprising:
    (a) an anode having an inlet for directing the humidified fuel stream to the catalytically active portion of the anode to produce cations from the humidified fuel stream and an outlet fuel stream;
    (b) a cathode having an inlet for directing the humidified oxidant stream to the catalytically active portion of the cathode to produce anions from the humidified oxidant stream, the anions reacting with the cations to form water at the cathode;
    (c) an ion exchange membrane interposed between the anode and the cathode, the membrane facilitating the migration of cations from the anode to the cathode and isolating the humidified fuel stream from the humidified oxidant stream; and
    (d) an electrical path for conducting electric current between the anode to the cathode, (E) a water separator for removing water from the outlet fuel stream to produce a dehumidified fuel stream and a removed water stream; and (F) a reservoir for receiving the removed water stream from the water separator.

At least one of the fuel humidification water supply and the oxidant humidification water supply is drawn from the reservoir.

In a still further embodiment, water accumulated at the cathode is removed in the anode outlet stream and the water so removed is employed as the coolant water source. Such a system comprises:

(A) a hydrogen-containing inlet fuel stream;
(B) an oxygen-containing inlet oxidant stream;
(C) an inlet coolant water stream;
(D) a fuel cell stack comprising:
  (1) an electrochemically active section comprising at least one fuel cell, the fuel cell comprising:
    (a) an anode having an inlet for directing the inlet fuel stream to the catalytically active portion of the anode to produce cations from the inlet fuel stream and an outlet fuel stream;
    (b) a cathode having an inlet for directing the inlet oxidant stream to the catalytically active portion of the cathode to produce anions from the inlet oxidant stream, the anions reacting with the cations to form water at the cathode;
    (c) an ion exchange membrane interposed between the anode and the cathode, the membrane facilitating the migration of cations from the anode to the cathode and isolating the inlet fuel stream from the inlet oxidant stream; and
    (d) an electrical path for conducting electric current between the anode to the cathode,
  (2) at least one coolant passage having an inlet for directing the inlet coolant water stream into thermal contact with the electrochemically active section to absorb heat generated within the active section and produce an outlet coolant water stream;

(E) a heat exchanger for removing heat from the outlet coolant water stream to produce a chilled coolant water stream;

(F) a water separator for removing water from the outlet fuel stream to produce a dehumidified fuel stream and a removed water stream; and (G) a reservoir for receiving the removed water stream from the water separator and the chilled coolant water stream from the heat exchanger.

The inlet coolant water stream is drawn from the reservoir.

BRIEF DESCRIPTION OF THE DRAWINGS

FIG. 7 is an exploded side elevation view of the solid polymer fuel cell stack illustrated schematically in FIGS. 3–6.

DETAILED DESCRIPTION OF THE PREFERRED EMBODIMENTS

Figure 1:
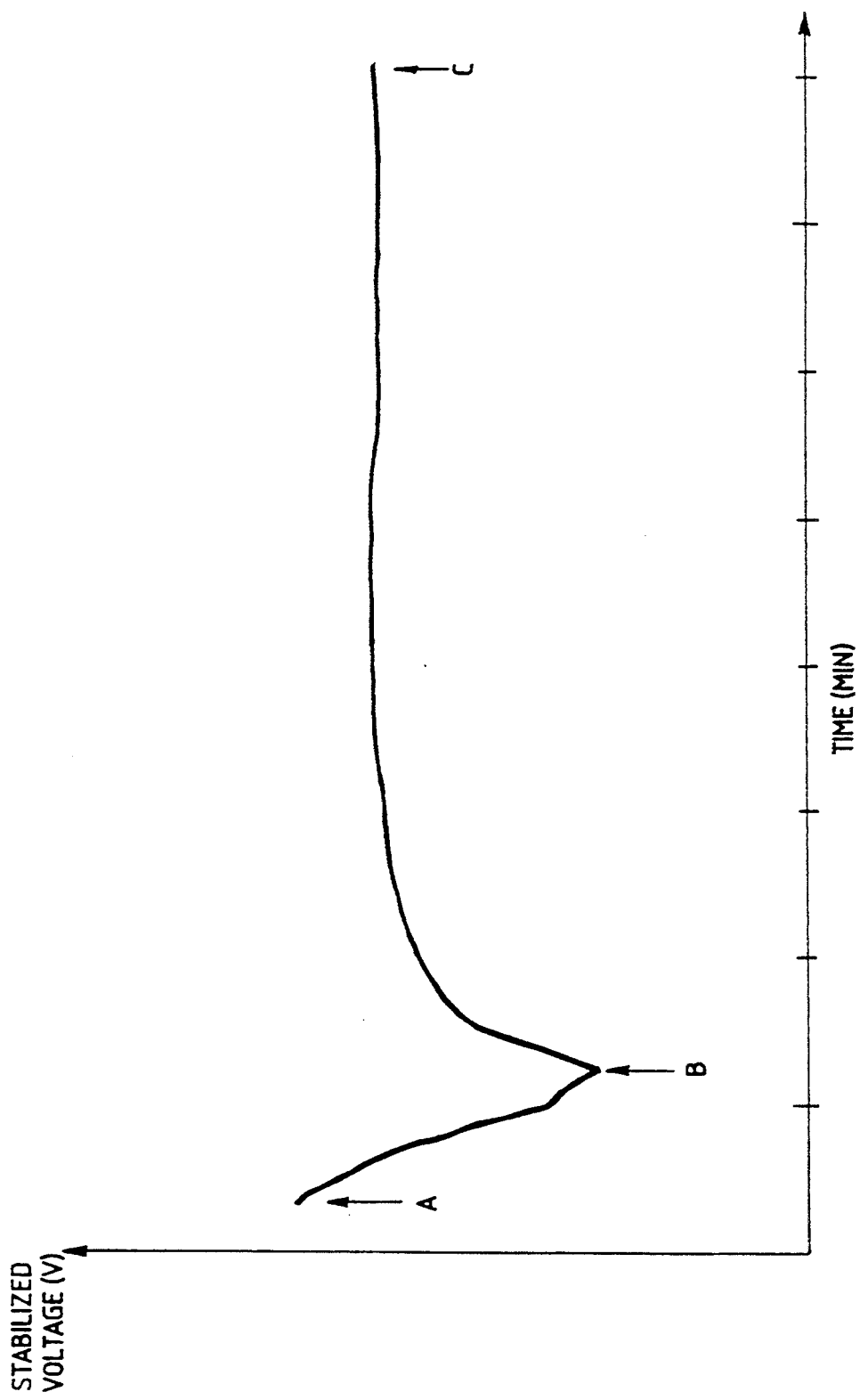
FIG. 1 is a plot of cell voltage as a function of time for a fuel cell employing the Dow experimental membrane, showing the effect upon cell voltage of ceasing the flow through the cathode output stream in a conventional fuel cell.

Turning first to FIG. 1, a plot of cell voltage as a function of time for a fuel cell employing the Dow experimental membrane shows the effect upon cell voltage of ceasing the flow through the cathode output stream, with and without the incorporation of anode water removal. In the fuel cell of FIG. 1, the Dow experimental membrane was employed with 6% PTFE incorporated in the porous gas diffusion electrode serving as the cathode. The fuel cell was operated at a constant 250 amps (1000 amperes per square foot of electrocatalytic area) using humidified substantially pure oxygen and hydrogen reactant streams. In the first portion of the experiment (between points A and B) the oxygen was dead-ended, and the following constant operating conditions were maintained: cell temperature=80 degrees C., 30/30 psig $O_2/H_2$ (inlet pressures), $H_2$ stoichiometry = approximately 2.0, $H_2$ pressure drop = 3.2 psi between the anode inlet and outlet. In the second portion of the experiment (between points B and C), the above conditions were maintained with the exception that $H_2$ stoichiometry was adjusted to approximately 6.7, resulting in an $H_2$ pressure drop between the anode inlet and outlet of approximately 28.8 psi.

As shown in the portion of FIG. 1 between points A and B, dead-ended operation results in a precipitous deterioration of the cell voltage, presumably due to flooding of the cathode catalyst sites. However, when a large pressure drop is initiated at point B by the use of a high rate of hydrogen flow ($H_2$ stoichiometry = 6.7; $H_2$ pressure drop=28.8 psi), and then sustained through point C, cell voltage recovers and stabilizes due to the removal of water accumulated at the cathode into the anode outlet stream.

Figure 2:
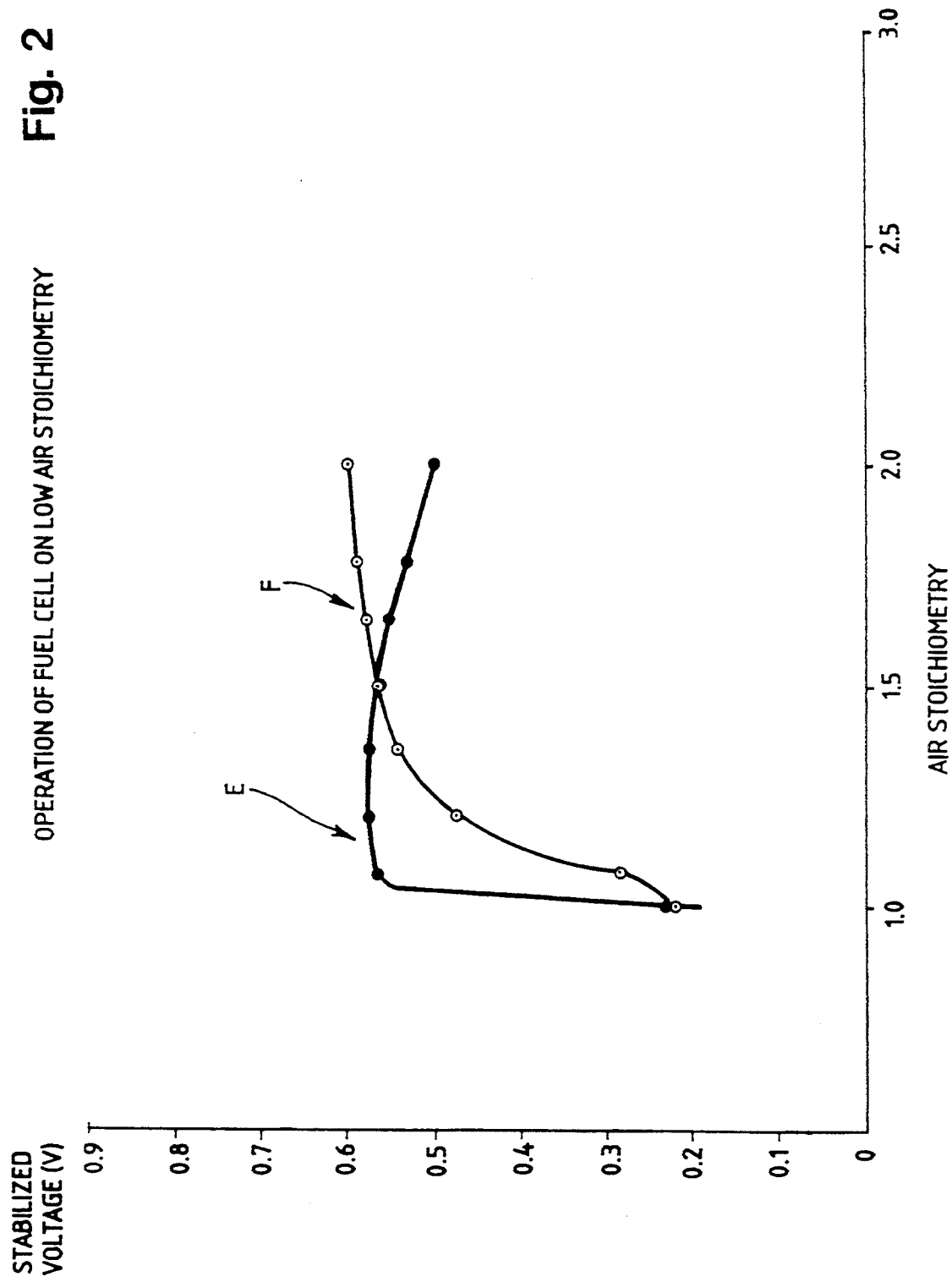
FIG. 2 shows two plots of cell voltage as a function of air stoichiometry for a fuel cell operated at two different $H_2$ stoichiometries and pressure drops, and therefore operated at two different rates of water removal at the anode.

Referring now to FIG. 2, two plots of cell voltage as a function of air stoichiometry for a fuel cell incorporating water removal at the anode are shown. In the fuel cell of FIG. 2, the Dow experimental membrane was employed with 6% PTFE incorporated in the porous gas diffusion electrode serving as the cathode. The fuel cell was operated at a constant 250 amps (1000 amperes per square foot of electrocatalytic area) using humidified substantially pure hydrogen and oxygen-containing air reactant streams. In the experiment, the following constant operating conditions were maintained: cell temperature=80 degrees C., 30/30 psig air/$H_2$ (inlet pressures). In plot E, $H_2$ stoichiometry was maintained at approximately 6.7 and the $H_2$ pressure drop was 28.8 psi between the anode inlet and outlet. Plot E shows that under these conditions, where water is effectively removed from the cathode into the anode exhaust stream, favorable fuel cell performance is maintained down to an air stoichiometry of approximately 1.0. The voltage deterioration at higher air stoichiometries is presumably due to dehydration of the ion conducting membrane because of excessive water removal in both the anode and cathode outlet streams.

In plot F of FIG. 2, the conditions of plot E were maintained with the exception that $H_2$ stoichiometry was adjusted to approximately 2.0 and the $H_2$ pressure drop between the anode inlet and outlet was adjusted to approximately 4.5 psi. Plot F shows that cell voltage substantially decreases as air stoichiometry is reduced when water accumulates at the cathode and is not removed in the anode outlet stream. Thus, in the absence of water removal at the anode as characterized by plot F, fuel cell performance at lower air stoichiometries is significantly inferior to that shown in plot E. To operate the fuel cell effectively under the conditions of plot F, higher air stoichiometries are required (approaching 2.0), resulting in undesirably higher parasitic loads.

Figure 3:
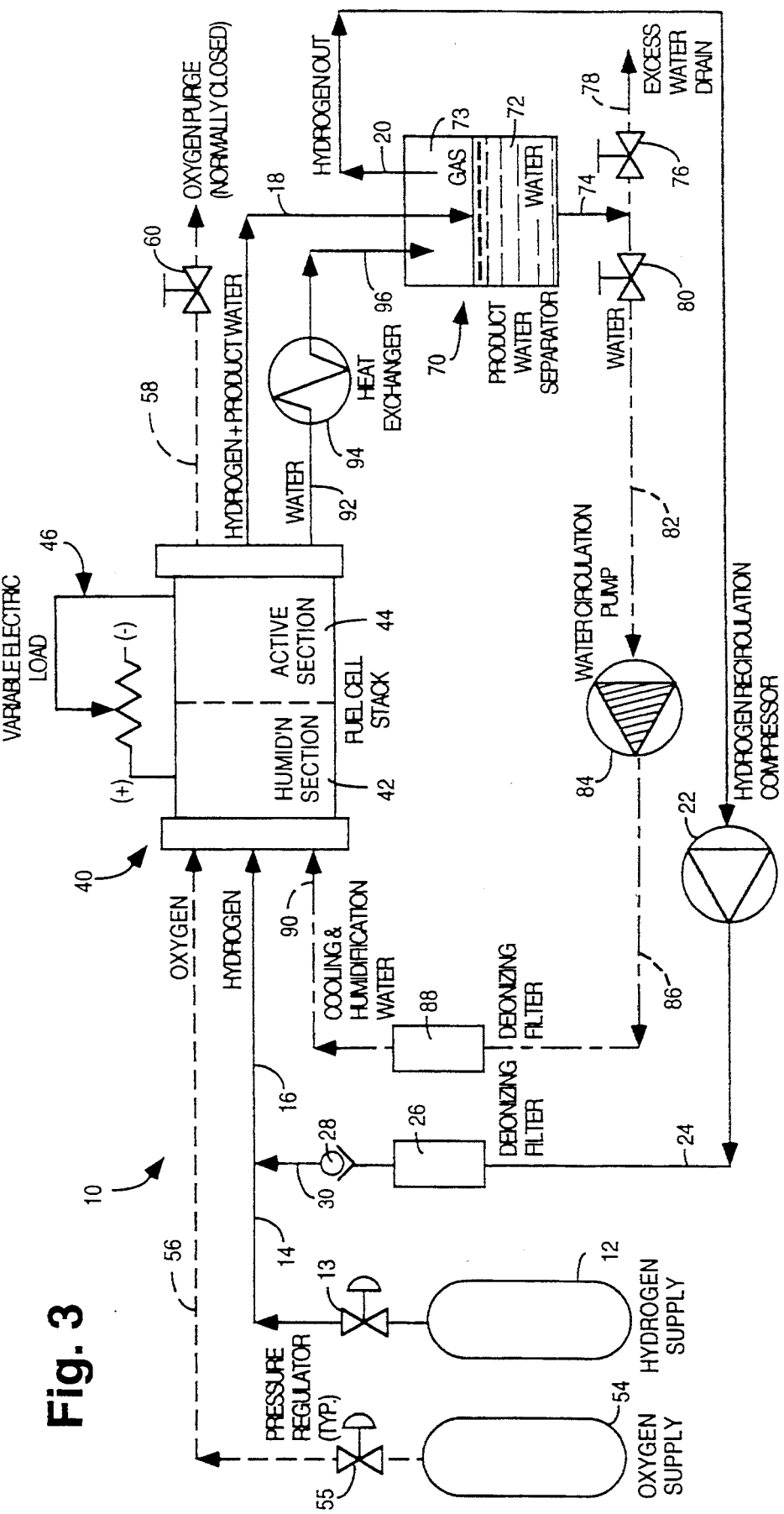
FIG. 3 is a schematic diagram of a fuel cell power generation system incorporating water removal at the anode and employing substantially pure hydrogen as the fuel stream and substantially pure oxygen as the oxidant stream.

Referring now to FIGS. 3–6, schematic diagrams of a fuel cell power generation systems incorporating water removal at the anode are illustrated. FIG. 3 is a schematic diagram of one embodiment of such a system 10 which employs a substantially pure hydrogen supply 12 and a substantially pure oxygen supply 54 as the reactant sources. System 10 includes three principal subsystems: (1) the fuel subsystem, (2) the oxidant subsystem, and (3) the coolant subsystem.

The fuel subsystem starts with hydrogen supply 12, which feeds fresh hydrogen stream 14 through pressure regulator valve 13, as shown in FIG. 3. Fresh hydrogen stream 14 joins with deionized recirculated hydrogen stream 30 to form inlet fuel stream 16, which is the fuel supply to fuel cell stack 40.

As shown in FIG. 3, fuel cell stack 40 includes an active section 44 and a humidification section 42. Active section 44 preferably includes the plurality of membrane electrode assemblies ("MEAs"), fluid flow field plates, coolant flow plates, electrical connections between the individual fuel cells, as well as control circuitry to generate electric power by the electrocatalytic reaction of the hydrogen and oxygen to form water as the reaction product. Each MEA preferably comprises a solid polymer ion exchange membrane; two sheets of porous electrically material disposed on opposite sides of the membrane, and an electrochemically effective amount of catalyst, preferably platinum in the case of hydrogen/oxygen fuel cells, disposed between each sheet of porous electrically conductive sheet and the membrane. One porous electrically conductive sheet with catalyst associated therewith is the anode, the other sheet is the cathode. A detailed description of the MEA structure is set forth in U.S. patent application Ser. No. 07/641,601 filed Jan. 15, 1991, now U.S. Pat. No. 5,260,143 issued Nov. 9, 1993, particularly FIG. 1 and the accompanying text in the specification. U.S. patent application Ser. No. 07/641,601 filed Jan. 15, 1991 is hereby incorporated by reference in its entirety herein.

Humidification section 42 preferably includes a plurality of membrane humidification cells which impart water to the respective inlet fuel and inlet oxidant streams. As discussed more fully below, the preferred source of the water in the humidification section is the coolant water exiting the active section 44, and the preferred source of coolant water for the active section 44 is the water 72 removed from the outlet fuel stream 18 exiting the fuel cell stack 40.

The inlet fuel stream 16 entering fuel cell stack 40 is humidified in humidification section 42 and then directed to the plurality of individual MEAs in the active section 44, where the hydrogen participates in the electrocatalytic reaction producing water and delivering electric power to the variable external electrical load 46. The outlet fuel stream 18 exiting fuel cell stack 40 contains, in addition to water from the humidification of the inlet stream, product water accumulated at the cathodes and drawn by a concentration gradient toward the anode across the membrane and absorbed as water into the hydrogen stream circulating through the active section 44.

As further illustrated in FIG. 3, outlet fuel stream 18 is directed to a water separator 70, which preferably consists of a reservoir for collecting condensed water 72 and a vapor space 73 for collecting the gas. The resulting gas, from which water has been removed in separator 70, is directed via hydrogen recirculation stream 20 to a hydrogen recirculation compressor or pump 22. The pressurized recirculated hydrogen stream 24 exiting compressor 22 is directed through a deionizing filter 26 and a check valve 28 to form deionized recirculated hydrogen stream 30. As previously described, stream 30 is combined with fresh hydrogen stream 14 to form the inlet fuel stream 16 entering fuel cell stack 40.

The oxidant subsystem of system 10 in FIG. 3 starts with oxygen supply 54, which feeds inlet oxidant stream 56 through pressure regulator valve 55. The inlet oxidant stream 56 entering fuel cell stack 40 is humidified in humidification section 42 and then directed to the plurality of individual MEAs in the active section 44, where the oxygen participates in the electrocatalytic reaction producing water and electric power to the variable external electrical load 46. In system 10 of FIG. 3, the inlet oxidant stream 56 is substantially dead-ended, which means that the oxygen supplied to the cathodes of fuel cell stack 40 is substantially entirely consumed in the active section 44, and the oxygen stoichiometry is therefore essentially 1.0. An oxygen purge stream 58 in fluid communication with the cathodes in fuel cell stack 40 provides a means to periodically eliminate accumulated impurities. Flow through oxygen purge stream 58 is initiated by the actuation of purge valve 60, which is normally closed to flow.

The coolant subsystem of system 10 in FIG. 3 starts with the water 72 in the reservoir of separator 70. Reservoir water stream 74 is directed to recirculated water stream 82 by the opening of recirculation water valve 80. The opening of purge water valve 76 directs a portion of the water from reservoir stream 74 to a drain stream 78, where excess water is expelled externally. Recirculated water stream 82 is directed through a water circulation pump 84 to pressurized recirculated water stream 86. Water stream 86 is then directed through a deionizing filter 88 to water inlet stream 90. The water in inlet stream 90 is the preferred coolant fluid for the active section 44 of the fuel cell stack 40. Once it has passed through the active section 44, the coolant water is close to cell temperature and is therefore the preferred source of water for the humidification section 42 of fuel cell stack 40. After passing through the humidification section 42, the water stream is directed via outlet water stream 92 to a heat exchanger 94, where heat is removed from the water to form chilled water stream 96. Chilled water stream 96 is then directed to water separator 70, where it participates in the condensation of water from outlet fuel stream 18.

Figure 4:
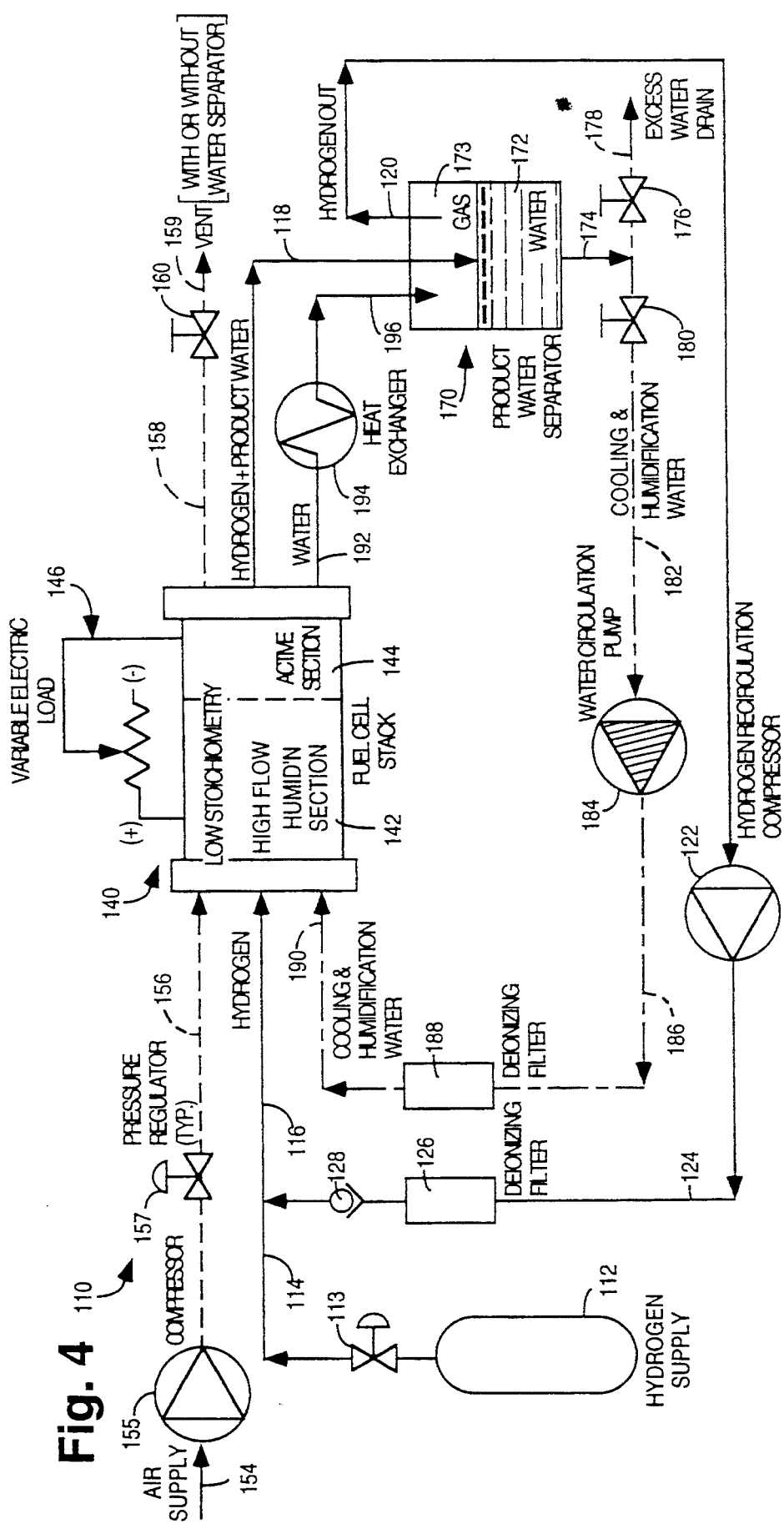
FIG. 4 is a schematic diagram of a fuel cell power generation system incorporating water removal at the anode and employing substantially pure hydrogen as the fuel stream and oxygen-containing air as the oxidant stream.

FIG. 4 is a schematic diagram of a second embodiment of a fuel cell power generation system 110 incorporating water removal at the anode. System 110 employs a substantially pure hydrogen supply 112 and an oxygen-containing air supply 154 as the reactant sources. The fuel cell stack 140 of system 110, comprising humidification section 142 and 144 and providing electric power to a variable external load 146, is substantially identical to the fuel cell stack 40 in FIG. 3. Like system 10 in FIG. 3, system 110 includes fuel, oxidant and coolant subsystems.

The fuel subsystem of system 110 in FIG. 4 is substantially identical to the fuel subsystem of system 10 in FIG. 3, with streams 114, 116, 118, 120, 124 and 130 of system 110 in FIG. 4 corresponding to and having functions analogous to streams 14, 16, 18, 20, 24 and 30, respectively, of system 10 in FIG. 3. Similarly, fuel cell stack 140 in FIG. 4, comprising active section 144 and humidification section 142 and providing electric power to variable external load 146, is substantially identical to fuel cell stack 40 in FIG. 3. Likewise, pressure regulator valve 113, water separator 170, hydrogen recirculation compressor 122, deionizing filter 126 and check valve 128 of system 110 in FIG. 4 correspond to and have functions analogous to valve 13, separator 70, compressor 22, deionizing filter 26 and check valve 28, respectively, of system 10 in FIG. 3.

The oxidant subsystem of system 110 in FIG. 4 starts with oxygen-containing air supply 154, which is directed through a compressor 155 and pressure regulator 157 to an inlet oxidant stream 156. Inlet oxidant stream 156 is fed to fuel cell 140 employing a relatively low oxygen stoichiometry, on the order of approximately 1.1 to 2.0. The inlet oxidant stream 156 entering fuel cell stack 140 is humidified in humidification section 142 and then directed to the plurality of individual MEAs in the active section 144, where the oxygen in the humidified air participates in the electrocatalytic reaction producing water and electric power to the variable external load 146. An outlet oxidant stream 158 is in fluid communication with the cathodes in fuel cell stack 140. Flow through outlet oxidant stream 158 is regulated by the actuation of valve 160 to vent stream 159. The water in vent stream 159 can optionally be separated from the gaseous components, as in separator 170, prior to expelling the vent stream from the system.

The coolant subsystem of system 110 in FIG. 4 is substantially identical to the coolant subsystem of system 10 in FIG. 3, with streams 174, 178, 182, 186 and 190 of system 110 in FIG. 4 corresponding to and having functions analogous to streams 74, 78, 82, 86 and 90, respectively, of system 10 in FIG. 3. Likewise, valves 176 and 180, water recirculation pump 184, deionizing filter 188 and heat exchanger 194 of system 110 in FIG.

4 correspond to and have functions analogous to valves 76 and 80, pump 84, deionizing filter 88 and heat exchanger 94, respectively, of system 10 in FIG. 3.

Figure 5:
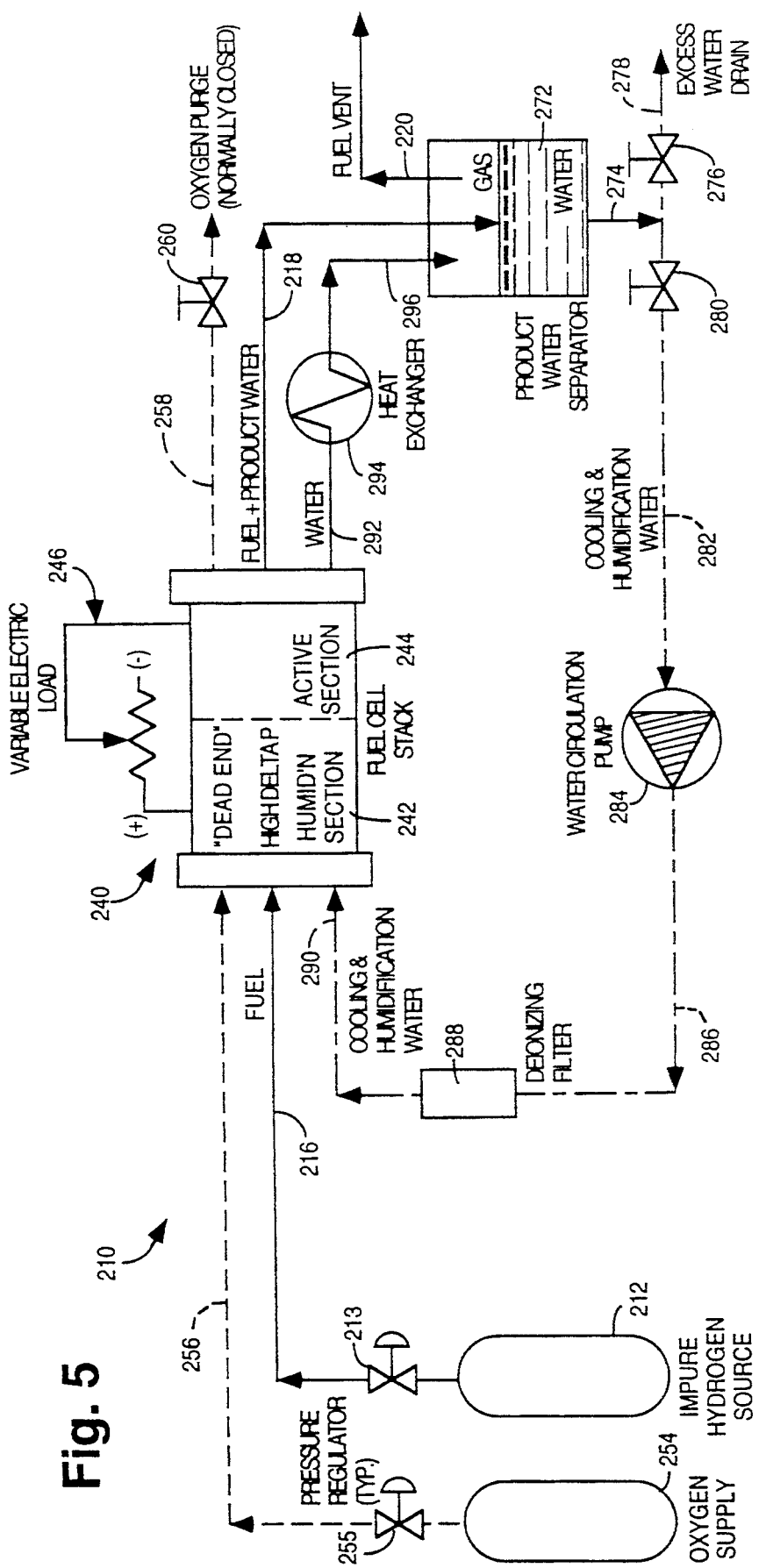
FIG. 5 is a schematic diagram of a fuel cell power generation system incorporating water removal at the anode and employing impure hydrogen as the fuel stream and substantially pure oxygen as the oxidant stream.

FIG. 5 is a schematic diagram of a third embodiment of a fuel cell power generation system 210 incorporating water removal at the anode. System 210 employs an impure hydrogen supply 212 and a substantially pure oxygen supply 254 as the reactant sources. The fuel cell stack 240 of system 210, comprising humidification section 242 and 244 and providing electric power to a variable external load 246, is substantially identical to the fuel cell stacks 40 and 140 in FIGS. 3 and 4, respectively. Like systems 10 and 110 in FIGS. 3 and 4, respectively, system 210 includes fuel, oxidant and coolant subsystems.

The oxidant subsystem of system 210 is substantially identical to that of system 10 in FIG. 3, with streams 256 and 258 of system 210 in FIG. 5 corresponding to streams 56 and 58 of system 10 in FIG. 3, the substantially pure oxygen supply 254 of system 210 in FIG. 5 corresponding to oxygen supply 54 in system 10 in FIG. 3, and valves 255 and 260 of system 210 in FIG. 5 corresponding to and having functions analogous to valves 55 and 60 of system 10 in FIG. 3.

The coolant subsystem of system 210 in FIG. 5 is also substantially identical to the coolant subsystem of system 10 in FIG. 3, with streams 274, 278, 282, 286 and 290 of system 210 in FIG. 5 corresponding to and having functions analogous to streams 74, 78, 82, 86 and 90, respectively, of system 10 in FIG. 3. Likewise, valves 276 and 280, water recirculation pump 284, deionizing filter 288 and heat exchanger 294 of system 210 in FIG. 5 correspond to and have functions analogous to valves 76 and 80, pump 84, deionizing filter 88 and heat exchanger 94, respectively, of system 10 in FIG. 3.

The fuel subsystem of system 210 in FIG. 5 starts with impure hydrogen supply 212, such as that obtained from the conversion of hydrocarbons to hydrogen and other byproducts such as carbon dioxide and trace amounts of carbon monoxide. Impure hydrogen supply 212 feeds inlet fuel stream 216 through pressure regulator valve 213, as shown in FIG. 5. Inlet fuel stream 216 is fed to fuel cell 240 employing a relatively high pressure drop between the inlet fuel stream 216 to the fuel cell stack 240 and the outlet fuel stream 218. The inlet fuel stream 216 entering fuel cell stack 240 is humidified in humidification section 242 and then directed to the plurality of individual MEAs in the active section 244, where the hydrogen in the impure humidified stream participates in the electrocatalytic reaction producing water and electric power to the variable external load 246. The outlet fuel stream 218 exiting fuel cell stack 240 contains, in addition to water from the humidification of the inlet fuel stream 216, product water accumulated at the cathodes and drawn by a concentration gradient toward the anodes across the membranes and absorbed as water into the hydrogen stream circulating through the active section 244.

As further illustrated in FIG. 5, outlet fuel stream 218 is directed to a water separator 270, which preferably consists of a reservoir for collecting condensed water 272 and a vapor space 273 for collecting the gas. The resulting gas, from which water has been removed in separator 270, is vented from the system 210.

Figure 6:
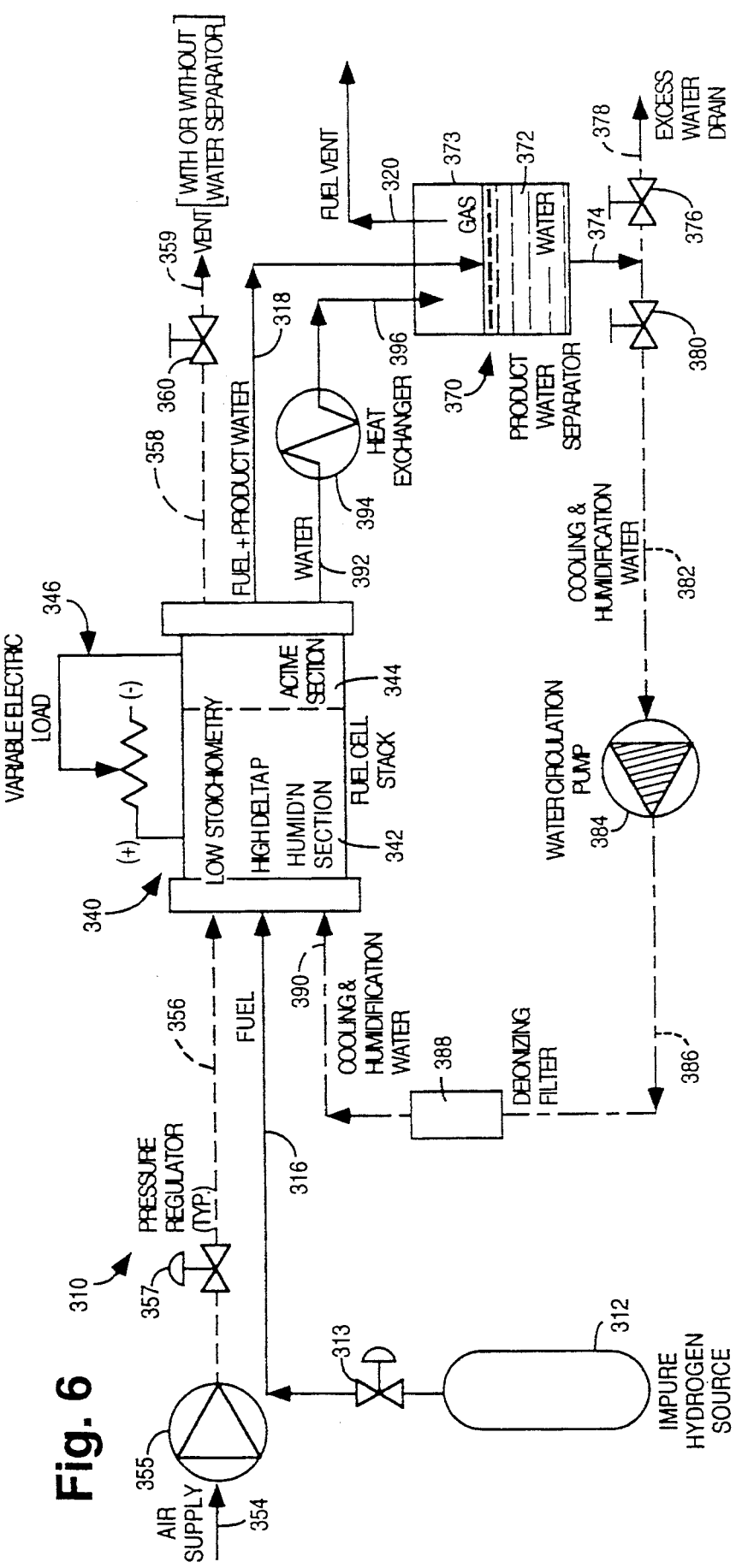
FIG. 6 is a schematic diagram of a fuel cell power generation system incorporating water removal at the anode and employing impure hydrogen as the fuel stream and oxygen-containing air as the oxidant stream.

FIG. 6 is a schematic diagram of a fourth embodiment of a fuel cell power generation system 310 incorporating water removal at the anode. System 310 employs an impure hydrogen supply 212 and oxygen-containing air supply 254 as the reactant sources. The fuel cell stack 340 of system 310, comprising humidification section 342 and 344 and providing electric power to a variable external load 346, is substantially identical to the fuel cell stacks 40, 140 and 240 in FIGS. 3, 4 and 5, respectively. Like systems 10, 110 and 210 in FIGS. 3, 4 and 5, respectively, system 310 includes fuel, oxidant and coolant subsystems.

The fuel subsystem of system 310 in FIG. 6 is substantially identical to the fuel subsystem of system 210 in FIG. 5, with streams 316, 318 and 320 of system 310 in FIG. 6 corresponding to and having functions analogous to streams 216, 218 and 220 of system 220 in FIG. 5. Similarly, impure hydrogen source 312, pressure regulator 313, and water separator 370 of system 310 in FIG. 6 correspond to and have functions analogous to impure hydrogen source 212, pressure regulator 213, and water separator 270 of system 210 in FIG. 5.

The oxidant subsystem of system 310 in FIG. 6 is substantially identical to the oxidant subsystem of system 110 in FIG. 4, with streams 356, 358 and 359 of system 310 in FIG. 6 corresponding to and having functions analogous to streams 156, 158 and 159 of system 110 in FIG. 4. Similarly, air supply 354, compressor 355, pressure regulator 357 and valve 360 of system 310 in FIG. 6 correspond to and have functions analogous to air supply 154, compressor 155, pressure regulator 157 and valve 160 of system 110 in FIG. 4.

The coolant subsystem of system 310 in FIG. 6 is substantially identical to the coolant subsystem of system 10 in FIG. 3, with streams 374, 378, 382, 386 and 390 of system 310 in FIG. 6 corresponding to and having functions analogous to streams 74, 78, 82, 86 and 90, respectively, of system 10 in FIG. 3. Likewise, valves 376 and 380, water recirculation pump 384, deionizing filter 388 and heat exchanger 394 of system 310 in FIG. 6 correspond to and have functions analogous to valves 76 and 80, pump 84, deionizing filter 88 and heat exchanger 94, respectively, of system 10 in FIG. 3.

Referring now to FIG. 7, a fuel cell stack assembly 410 of the type referred to in FIGS. 3-6 as fuel cell stacks 40, 140, 240 and 340, respectively, is generally illustrated in exploded form. The fuel cell stack assembly 410 includes a pair of end plates 411, 412 which conveniently are, respectively, a fluid end plate 411 and a compression end plate 412. Plates 411 and 412 terminate the stack assembly 410. A plurality of threaded tie rods 415 extending between the end plates 411 and 412. Tie rods 415 are secured by tie rod nuts 445 to retain and hold the stack assembly 410 in its assembled condition.

An electrical isolation plate 414 is positioned inside the end plate 411. A piston 417 is positioned within the end plate 412. Bus plates 420, 421 are located on opposite ends of the active section of stack assembly 410, as illustrated in FIG. 7, and deliver the current generated by the stack assembly 410 to an external electrical load (not shown). Cooling water jackets 422, 423 are located immediately inside the bus plates 420, 421.

The stack assembly 410 includes an active section, generally illustrated at 424, and a humidification section, generally illustrated at 430. The active section 424 includes, in addition to the bus plates 420, 421 and cooling water jackets 422, 423, a plurality of identical assemblies illustrated generally at 431, each assembly consisting of three fluid flow field plates 432, 433, 434 and two membrane electrode assemblies (MEAs) 440 which are interposed between the flow field plates 432, 433, 434.

In each assembly 431, the left-most flow field plate 432 carries the fuel in the form of substantially pure hydrogen gas on one side and, optionally, a coolant fluid in channels on the opposite side of plate 432. MEA 440 is interposed between plates 432 and 433. The center flow plate 433 carries the oxidant in the form of substantially pure oxygen gas or oxygen-containing air on one side and hydrogen on the opposite side. The right-most plate 434 carries the oxidant on the side adjacent the MEA 440 and, optionally, coolant fluid (preferably water) on the opposite side of plate 434. The configuration of the assembly 431 provides for the hydrogen and the oxidant to be located on opposite sides of each MEA 440 and also provides for a coolant fluid flow plate to be located adjacent each MEA 440, if desired. This configuration extends throughout the active section 424 of the fuel cell stack 410.

The humidification section 430 of the fuel cell stack 410 includes a plurality of oxidant humidification flow field plates 441 generally located on the left hand side of the humidification section 430 illustrated in FIG. 7 and a plurality of fuel humidification flow field plates 442 generally located on the right hand side of the humidification section 430. The humidification section 430 also includes a plurality of fuel humidification membranes 437 and a plurality of oxidant humidification membranes 436 positioned between the fuel humidification flow field plates 442 and the oxidant humidification flow field plates 441, respectively.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electric power generation system comprising:
    (A) a hydrogen-containing inlet fuel stream;
    (B) an oxygen-containing inlet oxidant stream;
    (C) a fuel cell stack comprising at least one fuel cell comprising:
        (1) an anode having an inlet for directing said inlet fuel stream to the catalytically active portion of said anode, said anode producing cations from said fuel stream and an outlet fuel stream;
        (2) a cathode having an inlet for directing said inlet oxidant stream to the catalytically active portion of said cathode, said cathode producing anions from said oxidant stream, said anions reacting with said cations to form water at said cathode;
        (3) a cation exchange membrane interposed between said anode and said cathode, said membrane facilitating the migration of cations from said anode to said cathode and isolating said inlet fuel stream from said inlet oxidant stream; and
        (4) an electrical path for conducting electric current between said anode to said cathode; and
        (5) means for maintaining the partial pressure of water vapor in said outlet fuel stream below the saturation pressure of water vapor contained therein;
    (D) a water separator for removing water from said outlet fuel stream to produce a dehumidified fuel stream and a removed water stream;
    whereby a substantial portion of water accumulated at said cathode is absorbed in said outlet fuel stream.

2. The system of claim 1 wherein the stoichiometry of said inlet oxidant stream is less than about 2.0.

3. The system of claim 1 wherein said inlet fuel stream comprises substantially pure hydrogen gas and said dehumidified fuel stream is recirculated to said inlet fuel stream.

4. The system of claim 1 wherein said inlet fuel stream comprises hydrogen gas and byproducts from a hydrocarbon conversion process and said dehumidified fuel stream is vented from the system.

5. The system of claim 1 wherein said inlet oxidant stream is substantially pure oxygen gas and wherein the stoichiometry of said inlet oxidant stream is approximately 1.0, whereby said oxygen gas is substantially entirely consumed at said cathode.

6. The system of claim 5 wherein said cathode further comprises a normally closed purge valve, said purge valve opened periodically to vent said inlet oxidant stream from the system, thereby evacuating accumulated impurities from said cathode.

7. The system of claim 1 wherein said inlet oxidant stream comprises oxygen-containing air and said cathode further produces an outlet oxidant stream, said outlet oxidant stream being vented from the system.

8. The system of claim 7 further comprising a water separator for removing water from said outlet oxidant stream to produce a dehumidified oxidant stream and a removed water stream.

9. An electric power generation system comprising:
    (A) a hydrogen-containing inlet fuel stream;
    (B) an oxygen-containing inlet oxidant stream;
    (C) an inlet coolant water stream;
    (D) a humidification assembly comprising:
        (1) at least one fuel humidification section comprising a fuel humidification water supply and means for imparting water vapor from said fuel humidification water supply to said inlet fuel stream to produce a humidified fuel stream;
        (2) at least one oxidant humidification section comprising an oxidant humidification water supply and means for imparting water vapor from said oxidant humidification water supply to said inlet oxidant stream to produce a humidified oxidant stream;
    (E) a fuel cell stack comprising:
        (1) an electrochemically active section comprising at least one fuel cell, said fuel cell comprising:
            (a) an anode having an inlet for directing said humidified fuel stream to the catalytically active portion of said anode, said anode producing cations from said humidified fuel stream and an outlet fuel stream;
            (b) a cathode having an inlet for directing said humidified oxidant stream to the catalytically active portion of said cathode, said cathode producing anions from said humidified oxidant stream, said anions reacting with said cations to form water at said cathode;
            (c) a cation exchange membrane interposed between said anode and said cathode, said membrane facilitating the migration of cations from said anode to said cathode and isolating said humidified fuel stream from said humidified oxidant stream; and (d) an electrical path for conducting electric current between said anode to said cathode, and (e) means for maintaining the partial pressure of water vapor in said outlet fuel stream below the saturation pressure of water vapor contained therein;

(2) at least one coolant passage having an inlet for directing said inlet coolant water stream into thermal contact with said electrochemically active section to absorb heat generated within said active section and produce an outlet coolant water stream;

(F) a heat exchanger for removing heat from said outlet coolant water stream to produce a chilled coolant water stream;

(G) a water separator for removing water from said outlet fuel stream to produce a dehumidified fuel stream and a removed water stream;

(H) a reservoir for receiving said removed water stream from said water separator and said chilled coolant water stream from said heat exchanger;

wherein said inlet coolant water stream is drawn from said reservoir, and whereby a substantial portion of water accumulated at said cathode is absorbed in said outlet fuel stream.

10. The system of claim 9 wherein said outlet coolant water stream feeds at least one of said fuel humidification water supply and said oxidant humidification water supply.

11. The system of claim 10 wherein said coolant stream feeds both of said fuel humidification water supply and said oxidant humidification water supply.

12. The system of claim 9 wherein said water separator and said reservoir are integral, the water contained within said reservoir promoting the condensation of water from said outlet fuel stream.

13. The system of claim 9 wherein said means for imparting water from said fuel humidification water supply to said inlet fuel stream comprises a chamber for receiving said fuel humidification water supply, a chamber for receiving said inlet fuel stream, and a water transport membrane interposed between said chambers for transporting water from said fuel humidification water supply to said inlet fuel stream to produce a humidified fuel stream.

14. The system of claim 9 wherein said means for imparting water from said oxidant humidification water supply to said inlet oxidant stream comprises a chamber for receiving said oxidant humidification water supply, a chamber for receiving said inlet oxidant stream, and a water transport membrane interposed between said chambers for transporting water from said oxidant humidification water supply to said inlet oxidant stream to produce a humidified oxidant stream.

15. The system of claim 9 wherein said inlet fuel stream comprises substantially pure hydrogen gas and said dehumidified fuel stream is recirculated to said inlet fuel stream.

16. The system of claim 9 wherein said inlet fuel stream comprises hydrogen gas and byproducts from a hydrocarbon conversion process and said dehumidified fuel stream is vented from the system.

17. The system of claim 9 wherein said inlet oxidant stream is substantially pure oxygen gas and wherein said oxygen gas is substantially entirely consumed at said cathode.

18. The system of claim 17 wherein said cathode further comprises a normally closed purge valve, said purge valve opened periodically to vent said inlet oxidant stream from the system, thereby evacuating accumulated impurities from said cathode.

19. The system of claim 9 wherein said inlet oxidant stream comprises oxygen-containing air and said cathode further produces an outlet oxidant stream, said outlet oxidant stream being vented from the system.

20. The system of claim 9 further comprising a water separator for removing water from said outlet oxidant stream to produce a dehumidified oxidant stream and a removed water stream, said reservoir receiving said removed water stream from said water separator.

21. An electric power generation system comprising:
(A) a hydrogen-containing inlet fuel stream;
(B) an oxygen-containing inlet oxidant stream;
(C) a humidification assembly comprising:
(1) at least one fuel humidification section comprising a fuel humidification water supply and means for imparting water vapor from said fuel humidification water supply to said inlet fuel stream to produce a humidified fuel stream;
(2) at least one oxidant humidification section comprising an oxidant humidification water supply and means for imparting water vapor from said oxidant humidification water supply to said inlet oxidant stream to produce a humidified oxidant stream;
(D) a fuel cell stack comprising:
(1) an electrochemically active section comprising at least one fuel cell, said fuel cell comprising:
(a) an anode having an inlet for directing said humidified fuel stream to the catalytically active portion of said anode, said anode producing cations from said humidified fuel stream and an outlet fuel stream;
(b) a cathode having an inlet for directing said humidified oxidant stream to the catalytically active portion of said cathode, said cathode producing anions from said humidified oxidant stream, said anions reacting with said cations to form water at said cathode;
(c) a cation exchange membrane interposed between said anode and said cathode, said membrane facilitating the migration of cations from said anode to said cathode and isolating said humidified fuel stream from said humidified oxidant stream; and
(d) an electrical path for conducting electric current between said anode to said cathode, and
(e) means for maintaining the partial pressure of water vapor in said outlet fuel stream below the saturation pressure of water vapor contained therein;
(E) a water separator for removing water from said outlet fuel stream to produce a dehumidified fuel stream and a removed water stream;
(F) a reservoir for receiving said removed water stream from said water separator;
wherein at least one of said fuel humidification water supply and said oxidant humidification water supply is drawn from said reservoir, and whereby a substantial portion of water accumulated at said cathode is absorbed in said outlet fuel stream.

22. The system of claim 21 wherein said means for imparting water from said fuel humidification water supply to said inlet fuel stream comprises a chamber for receiving said fuel humidification water supply, a chamber for receiving said inlet fuel stream, and a water transport membrane interposed between said chambers for transporting water from said fuel humidification water supply to said inlet fuel stream to produce a humidified fuel stream.

23. The system of claim 21 wherein said means for imparting water from said oxidant humidification water supply to said inlet oxidant stream comprises a chamber for receiving said oxidant humidification water supply, a chamber for receiving said inlet oxidant stream, and a water transport membrane interposed between said chambers for transporting water from said oxidant humidification water supply to said inlet oxidant stream to produce a humidified oxidant stream.

24. The system of claim 21 wherein said inlet fuel stream comprises substantially pure hydrogen gas and said dehumidified fuel stream is recirculated to said inlet fuel stream.

25. The system of claim 21 wherein said inlet fuel stream comprises hydrogen gas and byproducts from a hydrocarbon conversion process and said dehumidified fuel stream is vented from the system.

26. The system of claim 21 wherein said inlet oxidant stream is substantially pure oxygen gas and wherein said oxygen gas is substantially entirely consumed at said cathode.

27. The system of claim 26 wherein said cathode further comprises a normally closed purge valve, said purge valve opened periodically to vent said inlet oxidant stream from the system, thereby evacuating accumulated impurities from said cathode.

28. The system of claim 21 wherein said inlet oxidant stream comprises oxygen-containing air and said cathode further produces an outlet oxidant stream, said outlet oxidant stream being vented from the system.

29. An electric power generation system comprising:
(A) a hydrogen-containing inlet fuel stream;
(B) an oxygen-containing inlet oxidant stream;
(C) an inlet coolant water stream;
(D) a fuel cell stack comprising:
  (1) an electrochemically active section comprising at least one fuel cell, said fuel cell comprising:
    (a) an anode having an inlet for directing said inlet fuel stream to the catalytically active portion of said anode, said anode producing cations from said inlet fuel stream and an outlet fuel stream;
    (b) a cathode having an inlet for directing said inlet oxidant stream to the catalytically active portion of said cathode, said cathode producing anions from said inlet oxidant stream, said anions reacting with said cations to form water at said cathode;
    (c) a cation exchange membrane interposed between said anode and said cathode, said membrane facilitating the migration of cations from said anode to said cathode and isolating said inlet fuel stream from said inlet oxidant stream; and
    (d) an electrical path for conducting electric current between said anode to said cathode, and
    (e) means for maintaining the partial pressure of water vapor in said outlet fuel stream below the saturation pressure of water vapor contained therein;
  (2) at least one coolant passage having an inlet for directing said inlet coolant water stream into thermal contact with said electrochemically active section to absorb heat generated within said active section and produce an outlet coolant water stream;
(E) a heat exchanger for removing heat from said outlet coolant water stream to produce a chilled coolant water stream;
(F) a water separator for removing water from said outlet fuel stream to produce a dehumidified fuel stream and a removed water stream;
(G) a reservoir for receiving said removed water stream from said water separator and said chilled coolant water stream from said heat exchanger;
wherein said inlet coolant water stream is drawn from said reservoir, and whereby a substantial portion of water accumulated at said cathode is absorbed in said outlet fuel stream.

30. The system of claim 29 wherein said water separator and said reservoir are integral, the water contained within said reservoir promoting the condensation of water from said outlet fuel stream.

31. The system of claim 1 wherein said anode further comprises an outlet for directing said outlet fuel stream from said anode and wherein said water vapor partial pressure maintaining means comprises means for imparting a pressure drop within said fuel cell between said anode inlet and said anode outlet.

32. The system of claim 31 wherein said pressure drop imparting means comprises at least one shaped orifice at said anode inlet.

33. The system of claim 31 wherein said pressure drop imparting means comprises a fluid flow passage having an extended length for directing said inlet fuel stream within said anode.

34. The system of claim 31 wherein said pressure drop imparting means comprises a fluid flow passage having a varying cross-sectional area for directing said inlet fuel stream within said anode.

35. The system of claim 1 wherein said anode further comprises an outlet for directing said outlet fuel stream from said anode and wherein said water vapor partial pressure maintaining means comprises means for controlling the temperature of said inlet fuel stream between said anode inlet and said anode outlet such that said temperature remains above the condensation temperature of water vapor contained therein.

36. The system of claim 35 wherein said water vapor partial pressure maintaining means further comprises means for controlling the pressure of said inlet fuel stream between said anode inlet and said anode outlet such that said temperature remains above the condensation temperature of water vapor contained therein.

37. The system of claim 9 wherein said anode further comprises an outlet for directing said outlet fuel stream from said anode and wherein said water vapor partial pressure maintaining means comprises means for imparting a pressure drop within said fuel cell between said anode inlet and said anode outlet.

38. The system of claim 37 wherein said pressure drop imparting means comprises at least one shaped orifice at said anode inlet.

39. The system of claim 37 wherein said pressure drop imparting means comprises a fluid flow passage having an extended length for directing said inlet fuel stream within said anode.

40. The system of claim 37 wherein said pressure drop imparting means comprises a fluid flow passage having a varying cross-sectional area for directing said inlet fuel stream within said anode.

41. The system of claim 9 wherein said anode further comprises an outlet for directing said outlet fuel stream from said anode and wherein said water vapor partial pressure maintaining means comprises means for controlling the temperature of said inlet fuel stream between said anode inlet and said anode outlet such that said temperature remains above the condensation temperature of water vapor contained therein.

42. The system of claim 41 wherein said water vapor partial pressure maintaining means further comprises means for controlling the pressure of said inlet fuel stream between said anode inlet and said anode outlet such that said temperature remains above the condensation temperature of water vapor contained therein.

43. The system of claim 21 wherein said anode further comprises an outlet for directing said outlet fuel stream from said anode and wherein said water vapor partial pressure maintaining means comprises means for imparting a pressure drop within said fuel cell between said anode inlet and said anode outlet.

44. The system of claim 43 wherein said pressure drop imparting means comprises at least one shaped orifice at said anode inlet.

45. The system of claim 43 wherein said pressure drop imparting means comprises a fluid flow passage having an extended length for directing said inlet fuel stream within said anode.

46. The system of claim 43 wherein said pressure drop imparting means comprises a fluid flow passage having a varying cross-sectional area for directing said inlet fuel stream within said anode.

47. The system of claim 21 wherein said anode further comprises an outlet for directing said outlet fuel stream from said anode and wherein said water vapor partial pressure maintaining means comprises means for controlling the temperature of said inlet fuel stream between said anode inlet and said anode outlet such that said temperature remains above the condensation temperature of water vapor contained therein.

48. The system of claim 47 wherein said water vapor partial pressure maintaining means further comprises means for controlling the pressure of said inlet fuel stream between said anode inlet and said anode outlet such that said temperature remains above the condensation temperature of water vapor contained therein.

49. The system of claim 29 wherein said anode further comprises an outlet for directing said outlet fuel stream from said anode and wherein said water vapor partial pressure maintaining means comprises means for imparting a pressure drop within said fuel cell between said anode inlet and said anode outlet.

50. The system of claim 49 wherein said pressure drop imparting means comprises at least one shaped orifice at said anode inlet.

51. The system of claim 49 wherein said pressure drop imparting means comprises a fluid flow passage having an extended length for directing said inlet fuel stream within said anode.

52. The system of claim 49 wherein said pressure drop imparting means comprises a fluid flow passage having a varying cross-sectional area for directing said inlet fuel stream within said anode.

53. The system of claim 29 wherein said anode further comprises an outlet for directing said outlet fuel stream from said anode and wherein said water vapor partial pressure maintaining means comprises means for controlling the temperature of said inlet fuel stream between said anode inlet and said anode outlet such that said temperature remains above the condensation temperature of water vapor contained therein.

54. The system of claim 53 wherein said water vapor partial pressure maintaining means further comprises means for controlling the pressure of said inlet fuel stream between said anode inlet and said anode outlet such that said temperature remains above the condensation temperature of water vapor contained therein.

* * * * *